United States Patent [19]

Billet

[11] 4,270,644
[45] Jun. 2, 1981

[54] TORSION SHOCK ABSORBER DEVICE SUITABLE FOR A CLUTCH FRICTION PLATE

[75] Inventor: René Billet, Lamorlaye, France

[73] Assignee: Societe Anonyme Francaise du Ferodo, Paris, France

[21] Appl. No.: 943,626

[22] Filed: Sep. 19, 1978

[30] Foreign Application Priority Data

Oct. 13, 1977 [FR] France ................. 77 30810

[51] Int. Cl.³ ............................... F16D 3/14
[52] U.S. Cl. ...................... 192/106.2; 64/27 F
[58] Field of Search .......... 192/106.2, 106.1; 64/27 F, 27 R

[56] References Cited

U.S. PATENT DOCUMENTS

| 1,750,828 | 3/1930 | Wemp | 192/106.2 X |
| 1,861,251 | 5/1932 | Wemp | 64/27 F X |

FOREIGN PATENT DOCUMENTS

| 459641 | 9/1949 | Canada | 192/107 |
| 2549103 | 5/1977 | Fed. Rep. of Germany | |
| 1219517 | 12/1959 | France | |
| 1570798 | 5/1969 | France | |
| 2097289 | 3/1972 | France | |
| 2171835 | 9/1973 | France | |
| 1174692 | 12/1949 | United Kingdom | |

*Primary Examiner*—Kenneth Downey
*Attorney, Agent, or Firm*—Young & Thompson

[57] ABSTRACT

The invention is applicable to a clutch friction plate of the kind comprising a pair of spaced washers mounted on a hub and located on either side of a friction disc provided with friction linings on both faces around its periphery. The friction disc is angularly movable to a limited extent relative to the hub against the action of spring means located in openings in the washers and a frictional couple resulting from the hub being elastically axially gripped between the washers.

Slot means are provided in at least one of the washers leading into openings therein so as to free at least one axially flexible region which can then act to effect the axially gripping and thereby adjust the frictional effect between the two relatively movable parts.

7 Claims, 12 Drawing Figures

U.S. Patent  Jun. 2, 1981  4,270,644
FIG.1
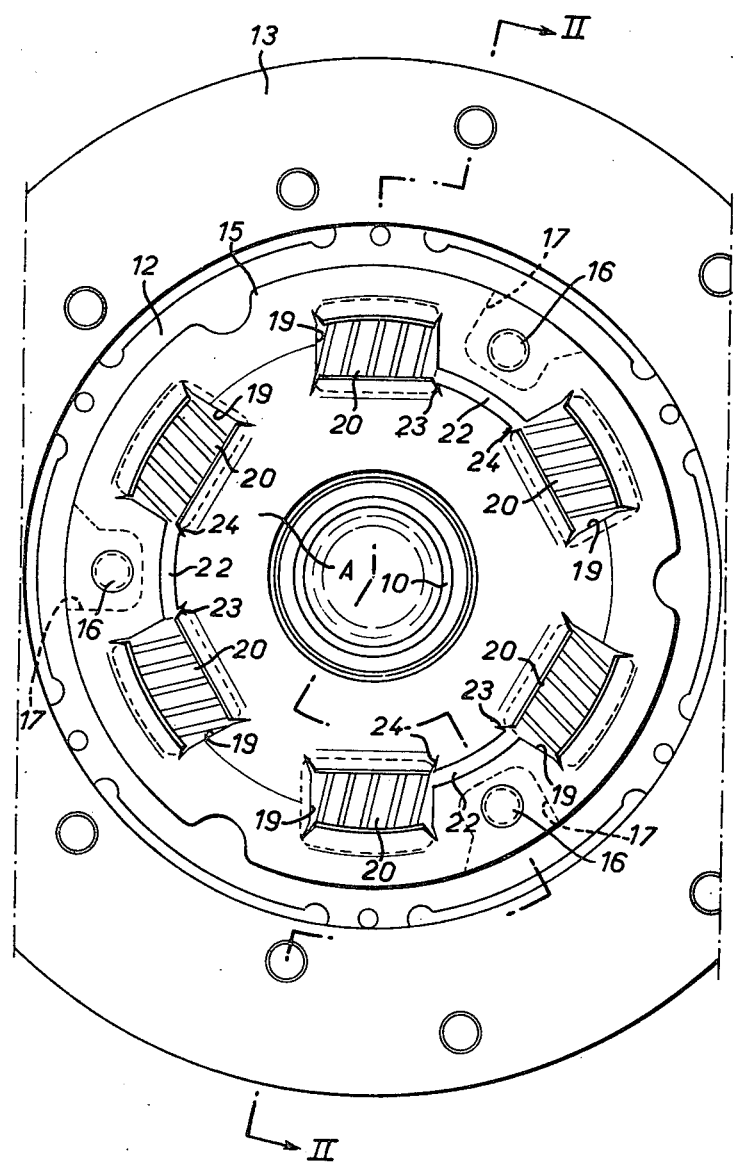
FIG.2
FIG.3
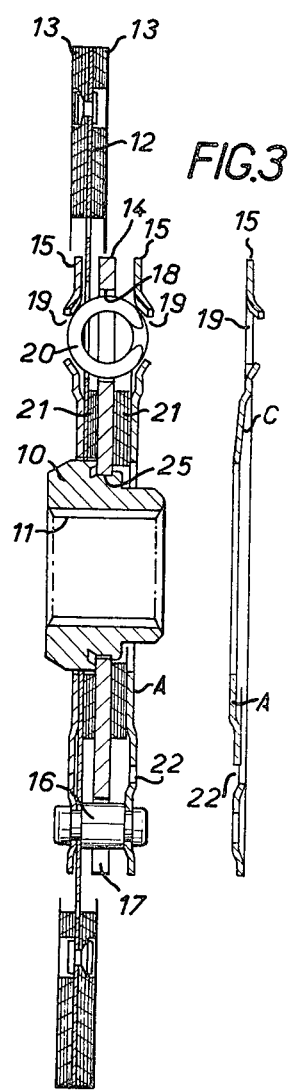

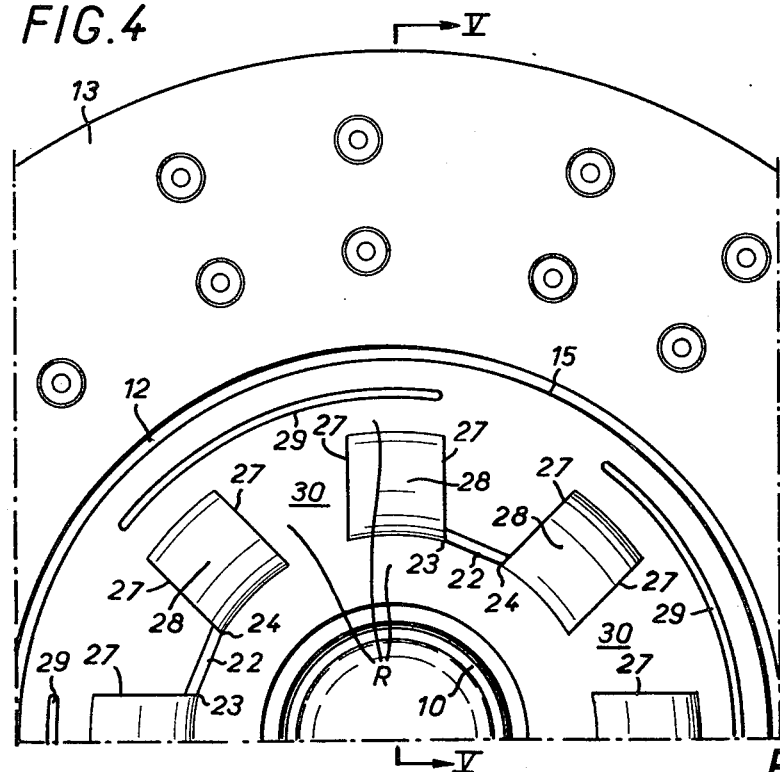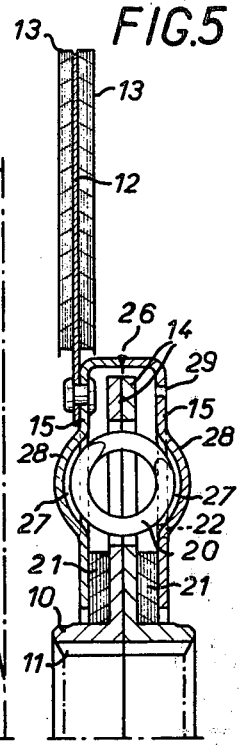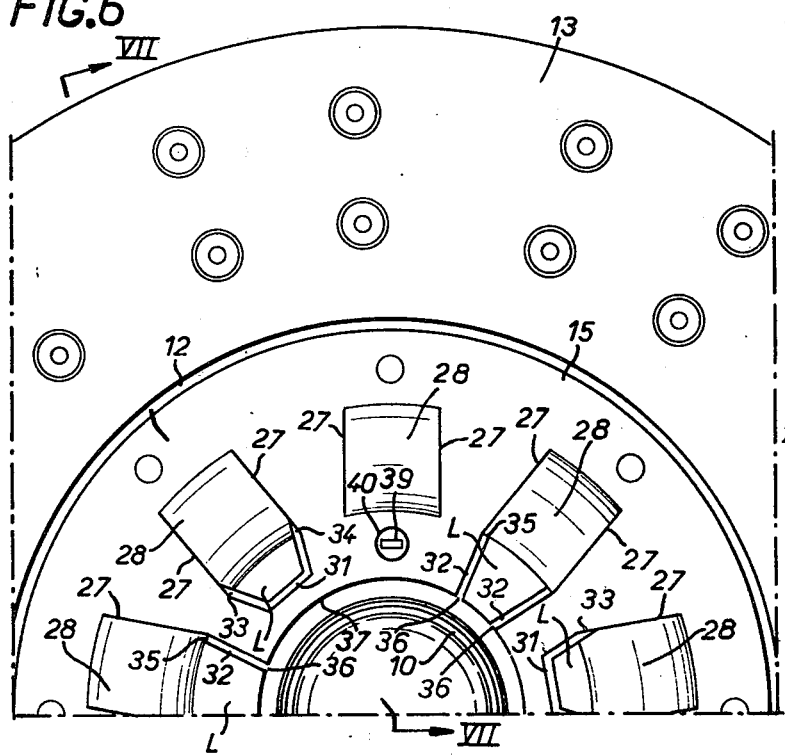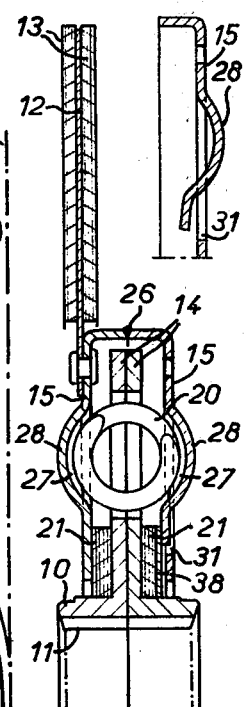

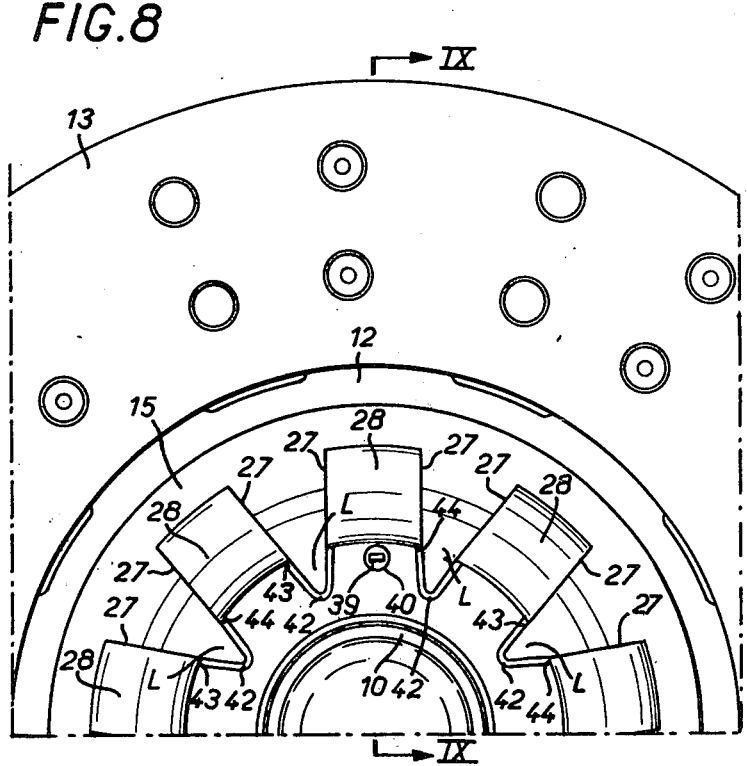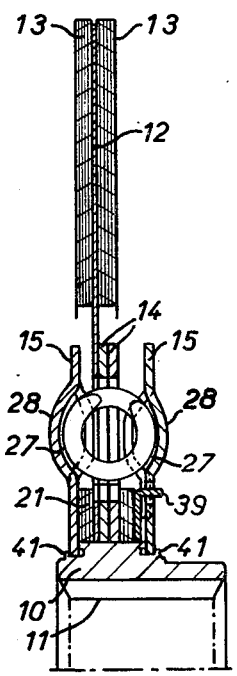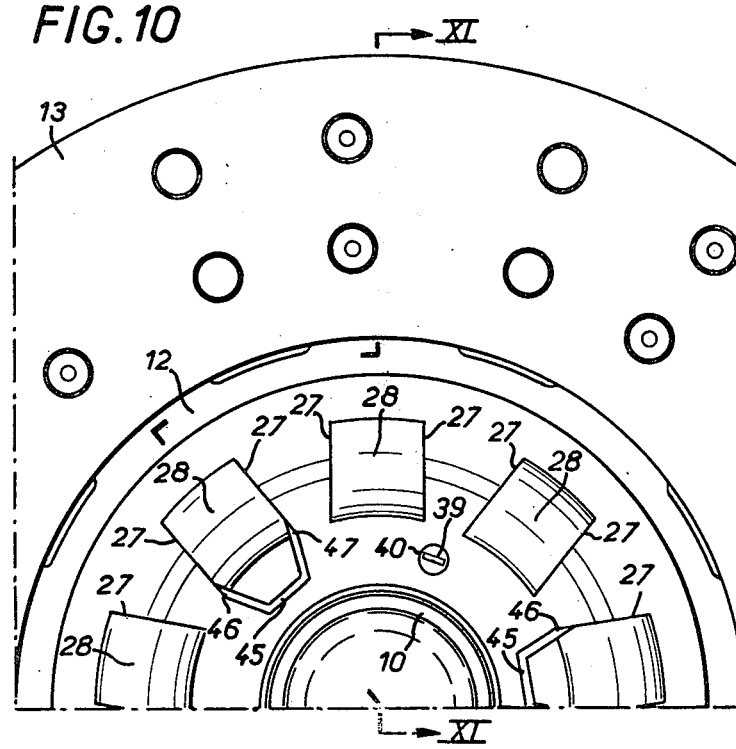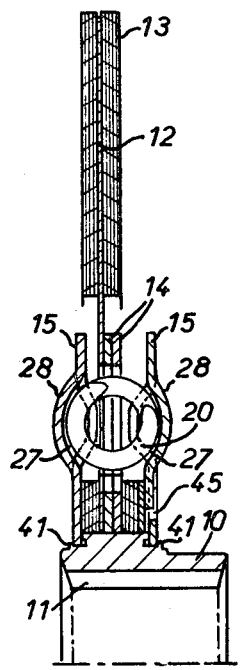

TORSION SHOCK ABSORBER DEVICE SUITABLE FOR A CLUTCH FRICTION PLATE

BACKGROUND OF THE INVENTION

The present invention relates generally to a torsion shock absorber device of the kind comprising two parts mounted for relative rotation with limited angular movability, and coupled by shock absorbing elastic means, the said angular movability being controlled by the said shock absorbing elastic means and also by friction between the said parts, this friction being arranged by axial elastic clamping, one of the said parts comprising a disc and the other part comprising two guide washers fastened together and disposed one on each side of the said disc, the disc and the guide washers having openings some of which serve to position the aforesaid elastic means.

The present invention relates more particularly, but not exclusively, to the case in which a torsion shock absorber device of this kind is provided for a clutch friction element, particularly for an automobile vehicle.

As is known, in the case of a clutch friction element of this kind one of the parts composing the said friction elements carries a friction disc which is provided around the periphery of each face with friction linings intended to be gripped between two plates which are rotationally fast with a shaft, (in practice the driving shaft), while the other of the said parts is fastened to a hub which is adapted to be engaged on another shaft, (in practice the driven shaft).

A clutch friction element of this kind makes it possible to achieve regulated transmission of a torque between that one of its component parts which is rotationally fast with the driving shaft and that one of its component parts which is rotationally fast with the driven shaft, that is to say to filter the vibrations, particularly acoustic vibrations, which may moreover be formed all along the kinematic chain in which the driving and driven shaft are interposed.

In the case of a small clutch friction element intended for transmitting low torque, its guide washers which assist the axial clamping may comply with the two conditions of being sufficiently strong in the circumferential direction to transmit this low torque and of being sufficiently flexible in the axial direction to effect the axial elastic gripping which adjusts the friction between the two parts of the torsion shock absorber device.

However, in the case of a clutch friction member which has to transmit a relatively substantial torque, which in turn implies considerable axial elastic gripping, the guide washers are too thick to be able to have sufficient flexibility in the axial direction, and in this case it is usual for the axial elastic gripping which adjusts the friction to be achieved by means of a relatively complex arrangement including, among other parts, a corrugated spring. Arrangements of this kind are generally satisfactory from the technical point of view, but they increase axial dimensions, sometimes to a prohibitive extent, and increase the cost price.

The present invention has as its object a torsion shock absorber device which makes it possible to retain extreme simplicity of construction together with small axial dimensions, and which is usable even when the torque to be transmitted is relatively high.

SUMMARY

According to the invention a torsion shock absorber device of the kind in question is characterised in that slot means are provided in at least one of the two guide washers and lead into openings in the said washer, in such a manner as to free in the latter at least one axially flexible region effecting the axial elastic gripping which adjusts the friction effect between the two parts of the device.

This gripping is effected with prestressing. The prestressing results from the fact that the washer is able to undergo deformation between its condition in the free state and its condition in the installed state.

By means of the arrangement according to the invention the strength of the guide washers is not excessively reduced circumferentially, because as the result of the cutting-out effected the slot means lead into the openings whose presence is moreover necessary in the washers, particularly for the purpose of positioning the shock absorbing elastic means. The slots are therefore only added to these openings, while making them suitable for providing the washer with increased axial flexibility. For example, if the openings are not provided with slots according to the invention it is possible to observe on the washer a deflection of the order of one tenth of a millimeter under axial elastic compression. When the slots according to the invention are provided this deflection may be of the order of one millimeter, or even ten times as great. It is thus possible to see the considerable effect of axial flexibility which can thus be achieved by removing an extremely small amount of material.

Depending on geometry this axial flexibility performance results from an elongation of the shortest path between the fastening point where the two washers are fastened to one another and the point where the axial elastic gripping is applied, or from the utilisation of only a fraction of the total stiffness of the washer, or else from both reasons at the same time.

However this may be, the guide washer may be as thick as is desired for the transmission of considerable torque in the circumferential direction, but at the same time the elastic compression in the axial direction is achieved under excellent conditions by means of flexible regions cut out for this purpose in the washer.

It should be noted that the slot means may be provided either in a single guide washer or in both of them.

The region of increased axial flexibility formed by cutting the guide washer may have any suitable shape, for example an annular shape, a rosette shape, or else the shape of a plurality of radial tongues.

The guide washers may be fastened together at the periphery either in the form of spaced elements or in continuous form, or else they may be fastened together in a central region.

The openings may consist either of open windows or of pairs of recesses associated with outwardly-bowed portions.

The present invention also provides, in a further aspect, a clutch friction element, particularly for automobile vehicles, containing a torsion shock absorber device of this kind, the hub of the friction element being fastened either to the disc or to the guide washers, while the disc of the friction element is, in the first case, fastened to the guide washers and in the second case to the disc.

BRIEF DESCRIPTION OF THE DRAWINGS

FIG. 1 is a partial view in elevation of a clutch friction element having a shock absorber device according to the invention;

FIG. 2 is a view of the said clutch friction disc in section on the broken line II—II in FIG. 1;

FIG. 3 shows in section one of the guide washers of the friction element of FIGS. 1 and 2, but before assembly;

FIG. 4 is a partial half-view in elevation of a modified clutch friction element;

FIG. 5 is a corresponding half-view in section on the line V—V in FIG. 4;

FIGS. 6, 8, and 10 are partial half-views in elevation of clutch friction elements which are similar to FIG. 4 but relate to various other respective modifications;

FIGS. 7, 9, and 11 are corresponding half-views in section respectively on the line VII—VII in FIG. 6, on the line IX—IX in FIG. 8, and on the line XI—XI in FIG. 10.

FIG. 7A is a partial view similar to FIG. 7 but shows the shape of the washer in the state of rest.

DESCRIPTION OF THE PREFERRED EMBODIMENTS

Reference will first be made to FIGS. 1 to 3 which relate by way of example to an application of the invention to a clutch friction disc.

This clutch friction disc comprises a hub 10 provided with grooves 11 for coupling to a shaft, for example a driven shaft, and a friction disc 12 carrying on its periphery, and on each of its faces, friction linings 13 intended to be gripped between two clutch plates rotationally fastened to another shaft, for example a driving shaft, for the purpose of coupling or uncoupling the two said shafts, and a torsion shock absorber device arranged between the hub 10 and the disc 12.

The torsion shock absorber device comprises two coaxial parts mounted for rotation in relation to one another with limited angular displaceability. One of these parts comprises a disc 14. The other part comprises two guide washers 15. The guide washers 15 are disposed one on each side of the disc 14 and are fastened together by spacer means 16. In the example illustrated in FIGS. 1 to 3 these spacer means comprise a series of members 16 in the form of small pillars. These members are disposed near the periphery of the guide washers 15. The members 16 pass freely through cutouts 17 which are provided in the disc 14 to permit the previously mentioned angular displaceability between the parts 14 and 15.

Openings are provided both at 18 in the disc 14 and at 19 in the guide washers 15. The openings 18 and 19 are composed of windows. Elastic shock absorber means, particularly coil springs 20, are positioned in the windows 18 and 19 in such a manner as to intervene circumferentially between the parts 14 and 15 in order to couple them rotationally and control their angular movement. Two friction washers 21 are inserted between the guide washers 15 and the disc 14 in such a manner that all the washers and the disc constitute an axial stack 15, 21, 14, 21, 15.

The disc 14 is fastened to the hub 10 at 25, while the friction disc 12 is fastened to the washers 15 by means of the member 16.

Slot means 22 are provided in at least one of the two washers 15 (only in the right-hand washer 15 in FIG. 2 in this example). These slot means comprise at least one slot 22 leading at both its ends 23 and 24 into the windows 19 of the washer 15.

Each slot 22 connects two successive windows 19 situated one on each side of a spacer 16. The ends 23 and 24 are disposed at the corners of the windows 19 nearer the axis. A region A of generally annular shape and having increased axial flexibility is thus formed in the washer 15, enabling the stack including the friction washers 21 to be elastically compressed without it being necessary to provide any additional equipment, that is to say while retaining an extremely simple construction with small axial dimensions even if the torque to be transmitted is considerable.

In FIG. 3 it will be appreciated that the washer 15 in which the slots 22 are formed has, before assembly, a curved shape at C in such a manner that the axial distance between the washers 15 will be shorter than the width of the axial stack at 12, 21, 14, 21. For the purposes of assembly, through the flattening of this curved shape C, this makes it possible to introduce an elastic preliminary stress effecting the axial gripping of the friction washers 21. This preliminary stress can be adjusted at will by modifying the width allowed for the axial stack of the various parts.

In the example shown in FIGS. 1 to 3 the axial flexibility of the annular region A of the washer 15 results from the fact that the slots 22 cut the direct connection between the fastening point 16 where the two washers are fastened together and the point 21 where the axial elastic gripping is applied, these slots 22 thus giving to the shortest path between 16 and 21 a tortuous shape which is longer than the direct radial distance which would occur in the absence of slots.

Reference will now be made to FIGS. 4 and 5, in which the arrangement is similar to that which has just been described with reference to FIGS. 1 to 3 and in which similar elements are given the same reference numerals.

However, in FIGS. 4 and 5 the two guide washers 15 are no longer fastened together by individual elements 16, but are continuously fastened together by a weld 26 on the periphery of the washers 15, the whole arrangement of which has the form of a cylindrical box open at the centre. Furthermore, the positioning openings for the elastic means 20 are provided in the washers 15 in the form of pairs of recesses 27 associated with convex portions or bows 28.

As previously, the slots 22 connect by their ends 23 and 24 certain of the recesses 27, but in this case other slots 29 are provided on the periphery of the washer 15 facing regions 30 which separate the recesses 27 not connected together by the first slots 22.

As previously, a region R of increased axial flexibility is thus formed in the washer 15, but here it has a more complicated shape similar to that of a rosette. As in FIGS. 1 to 3 this increased flexibility results from the fact that the slots 22 and 29 lengthen the distance between the fastening point and the point where the elastic axial gripping force is applied.

Reference will now be made to FIGS. 6, 7, and 7A, in which the arrangement is similar to that just described with reference to FIGS. 4 and 5. However, the slots 29 are dispensed with and the slots 22 are replaced by slots 31 and 32. Each slot 31 leads by its ends 33 and 34 into recesses 27 associated with one and the same bow 28. Only some of the recesses 27 are provided with a slot 31.

Each slot 32 leads by an end at 35 into a recess 27 and by its other end at 36 along the inner contour 37 of the washer 15. Two slots 32 are provided which are associated with a pair of recesses 27 associated with one and the same bow 28.

Obviously, when a pair of recesses 27 is equipped with a slot 31 it has no slots 32. Sone pairs of slots 27 may moreover not be provided with slots 31 or 32.

The slots 31 and 32 define tongues L of increased axial flexibility. These tongues L are curved before assembly (FIG. 7A) in order to effect prestressing in the elastic axial gripping after assembly. (FIG. 7).

Here the increased flexibility results not from an elongation of the shortest path between the fastening point and the point where the force is applied, but through the fact that each tongue L utilises only a fraction of the total stiffness of the washer 15.

A metal washer 38 is preferably interposed between the washer 15 provided with the tongues L and the adjacent washer 21.

The washer 38 is driven by this washer 15 by means of lugs 39 engaged in holes 40.

Reference will now be made to FIGS. 8 and 9, in which the arrangement is similar to that just described in connection with FIGS. 6 and 7, but here the friction disc 12 is fastened to the disc 14, while the washers 15 are fastened to the hub 10 at 41. At 27 the recesses of the washers 15 can be seen.

Here the slots, designated 42, connect the relative recesses 27 to successive bows 28. Each slot 42 leads by one end 43 into a recess 27 and by its other end 44 into the recess 27 of the neighboring bow 28. A succession of flexible tongues L adapted to compress the friction washers 21 axially is thus defined.

In the example of FIGS. 8 and 9 there are as many slots 42 as there are successive intervals between the bows 28, but certain intervals may be provided with slots and others be without slots.

It will be noted that the increased axial flexibility here results not only from the fact that each tongue L utilises a fraction of the total stiffness, but also from an elongation of the shortest path between the fastening point 41 and the point where the force is applied at 21.

Reference will now be made to FIGS. 10 and 11, in which the arrangement is similar to that just described in connection with FIGS. 8 and 9, and in which the disc 12 is fastened to the disc 14 while the guide washers 15 are fastened to the hub 10.

The recesses of the guide washers 15 can be recognised at 27, but here each slot, designated 45, cooperates with recesses 27 associated with one and the same bow 28, as in FIGS. 6 and 7.

More particularly, a slot 45 leads by its two ends 46 and 47 into the pair of recesses 27 so as to define a tongue L. One pair of recesses 27 out of three may be provided with a slot 45, while the other recesses have no slots.

In FIGS. 10 and 11 the increased flexibility results not only from the fact that each tongue L utilises a fraction of the total stiffness, but also from an elongation of the shortest path between the fastening point and the point where the force is applied.

It will be noted that the friction washers 21 can be dispensed with. In this case there will be metal-to-metal friction at 15, 14. The washers 21 may moreover be placed in any suitable position, for example near the inner periphery of the washers in the one case and near their outer periphery in the other. The slots 32 in FIG. 6 could be associated with different bows. The slots may lead either to the inner periphery or to the outer periphery of the washers.

I claim:

1. A torsion shock absorber device of the kind comprising two parts mounted for relative rotation with limited angular displaceability and rotationally coupled by shock absorbing elastic means, the said angular displaceability being controlled on the one hand by the said shock absorbing elastic means and on the other hand by friction between the said parts, which effect is adjusted by elastic axial gripping, one of the said parts comprising a disc and the other part comprising two guide washers fastened to one another and disposed one on each side of the said disc, the disc and the guide washers having openings, of which at least some serve to position the aforesaid elastic means, and wherein slot means are provided in at least one of the two guide washers leading into openings in the said washer in such a manner as to free in the latter at least one axially flexible region effecting the elastic axial gripping which adjusts the frictional effect between the two said parts, said slot means comprising at least one slot having two ends by which it leads respectively into two openings.

2. A device according to claim 1, in which each of the shock absorbing elastic means is positioned in a window-shaped aperture and said slot leads by its two ends respectively into two of said apertures.

3. A device according to claim 1, in which each of the shock absorbing elastic means is positioned inside a recess defined between two associated convex portions characterised in that the slot leads by its ends respectively into two recesses.

4. A torsion shock absorber device of the kind comprising two parts mounted for relative rotation with limited angular displaceability and rotationally coupled by shock absorbing elastic means, the said angular displaceability being controlled on the one hand by the said shock absorbing elastic means and on the other hand by friction between the said parts, which effect is adjusted by elastic axial gripping, one of the said parts comprising a disc and the other part comprising two guide washers fastened to one another and disposed one on each side of the said disc, the disc and the guide washers having openings, of which at least some serve to position the aforesaid elastic means, and wherein slot means are provided in at least one of the two guide washers leading into openings in the said washer in such a manner as to free in the latter at least one axially flexible region effecting the elastic axial gripping which adjusts the frictional effect between the two said parts, the guide washers being fastened together by a series of spaced members disposed near the periphery of the guide washers and offset in relation to the said openings, wherein the said slot means connect windows disposed one on each side of the said fastening members in such a manner as to give a generally annular shape to the said flexible region.

5. A torsion shock absorber device of the kind comprising two parts mounted for relative rotation with limited angular displaceability and rotationally coupled by shock absorbing elastic means, the said angular displaceability being controlled on the one hand by the said shock absorbing elastic means and on the other hand by friction between the said parts, which effect is adjusted by elastic axial gripping, one of the said parts comprising a disc and the other part comprising two guide washers fastened to one another and disposed one on each side of the said disc, the disc and the guide washers having openings, of which at least some serve to position the aforesaid elastic means, and wherein slot means are provided in at least one of the two guide washers leading into openings in the said washer in such a manner as to free in the latter at least one axially flexible region effecting the elastic axial gripping which adjusts the frictional effect between the two said parts, the guide washers being fastened together by fastening means which extend continuously on the periphery of the said guide washers, while the said openings are recesses associated with convex portions, wherein the said slot means connect certain of the recesses while other slots are disposed on the periphery, facing zones which separate the recesses which are not connected together by the said slot means, thus giving the said flexible region a generally rosette shape.

6. A torsion shock absorber device of the kind comprising two parts mounted for relative rotation with limited angular displaceability and rotationally coupled by shock absorbing elastic means, the said angular displaceability being controlled on the one hand by the said shock absorbing elastic means and on the other hand by friction between the said parts, which effect is adjusted by elastic axial gripping, one of the said parts comprising a disc and the other part comprising two guide washers fastened to one another and disposed one on each side of the said disc, the disc and the guide washers having openings, of which at least some serve to position the aforesaid elastic means, and wherein slot means are provided in at least one of the two guide washers leading into openings in the said washer in such a manner as to free in the latter at least one axially flexible region effecting the elastic axial gripping which adjusts the frictional effect between the two said parts, said at least one washer having outwardly convex portions that open at both ends to define said openings, each said convex portion terminating in a tongue that effects said elastic axial gripping, said slot means bordering said tongue and opening at both ends into said openings defined by the associated said tongue.

7. A torsion shock absorber device of the kind comprising two parts mounted for relative rotation with limited angular displaceability and rotationally coupled by shock absorbing elastic means, the said angular displaceability being controlled on the one hand by the said shock absorbing elastic means and on the other hand by friction between the said parts, which effect is adjusted by elastic axial gripping, one of the said parts comprising a disc and the other part comprising two guide washers fastened to one another and disposed one on each side of the said disc, the disc and the guide washers having openings, of which at least some serve to position the aforesaid elastic means, and wherein slot means are provided in at least one of the two guide washers leading into openings in the said washer in such a manner as to free in the latter at least one axially flexible region effecting the elastic axial gripping which adjusts the frictional effect between the two said parts, said at least one washer having outwardly convex portions that open at both ends to define said openings, each said convex portion terminating in a tongue that effects said elastic axial gripping, said slot means bordering said tongue and opening at one end into a said opening defined by the associated said tongue and at the other end through a margin of the washer.

* * * * *